United States Patent
Swoboda et al.

(10) Patent No.: US 12,486,382 B2
(45) Date of Patent: Dec. 2, 2025

(54) MONOMERS, OLIGOMERS AND POLYMERS OF SUGARS FUNCTIONALIZED WITH STRAIGHT OR BRANCHED FATTY ACIDS AND DERIVATIVES, THEIR COMPOSITIONS AND USES

(71) Applicant: TOTALENERGIES ONETECH, Courbevoie (FR)

(72) Inventors: Benjamin Swoboda, Orgeval (FR); Jean-Christophe Raboin, Chaumont sur Tharonne (FR)

(73) Assignee: TOTALENERGIES ONETECH, Courbevoie (FR)

( * ) Notice: Subject to any disclaimer, the term of this patent is extended or adjusted under 35 U.S.C. 154(b) by 548 days.

(21) Appl. No.: 17/915,866

(22) PCT Filed: Apr. 16, 2021

(86) PCT No.: PCT/EP2021/059967
§ 371 (c)(1),
(2) Date: Sep. 29, 2022

(87) PCT Pub. No.: WO2021/209621
PCT Pub. Date: Oct. 21, 2021

(65) Prior Publication Data
US 2023/0128452 A1 Apr. 27, 2023

(30) Foreign Application Priority Data

Apr. 17, 2020 (EP) .................................... 20170031

(51) Int. Cl.
*C08L 3/00* (2006.01)
*C08B 31/04* (2006.01)
*C08L 3/06* (2006.01)

(52) U.S. Cl.
CPC .............. *C08L 3/06* (2013.01); *C08B 31/04* (2013.01); *C08L 2205/035* (2013.01)

(58) Field of Classification Search
CPC ....... C08L 3/06; C08L 2205/035; C08B 31/04
USPC ..................................................... 106/205.2
See application file for complete search history.

(56) References Cited

U.S. PATENT DOCUMENTS

| | | | |
|---|---|---|---|
| 3,963,699 A | 6/1976 | Rizzi et al. | |
| 4,696,916 A | 9/1987 | Yasunori et al. | |
| 4,840,815 A | 6/1989 | Meyer et al. | |
| 4,973,489 A | 11/1990 | Meyer et al. | |
| 5,106,625 A * | 4/1992 | Yamamoto | A61Q 1/10 |
| | | | 424/47 |
| 5,840,883 A | 11/1998 | Suziki et al. | |
| 5,906,852 A | 5/1999 | Klemann et al. | |
| 10,435,634 B2 | 10/2019 | Germanaud et al. | |
| 10,457,963 B2 | 10/2019 | Shaw et al. | |
| 10,588,834 B2 | 3/2020 | Swoboda et al. | |
| 2008/0071079 A1 | 3/2008 | James et al. | |
| 2012/0316332 A1 | 12/2012 | Koike et al. | |
| 2016/0256367 A1 | 9/2016 | Charbit et al. | |

FOREIGN PATENT DOCUMENTS

| | | | | |
|---|---|---|---|---|
| EP | 2537865 A1 * | 12/2012 | | A61K 8/73 |
| JP | S6070094 | 4/1985 | | |
| JP | 2002363030 | 12/2002 | | |
| WO | 2015014789 | 2/2015 | | |

OTHER PUBLICATIONS

Lucie Crépy et al, "Synthesis of Cellulose Fatty Esters as Plastics-Influence of the Degree of Substitution and the Fatty Chain Length on Mechanical Properties", Chemsuschem, (Feb. 23, 2009), vol. 2, No. 2, doi:10.1002/cssc.200800171, ISSN 1864-5631, pp. 165-170, XP055136519 [A] 1-15 * table 1 * DOI: http://dx.doi.org/10.1002/cssc.200800171.

Kshirsagar et al, "Optimization of starch oleate derivatives from native corn and hydrolyzed corn starch by response surface methodology", Carbohydrate Polymers, Applied Science Publishers, Ltd Barking, GB, (May 10, 2007), vol. 69, No. 3, doi: 10.1016/J.CARBPOL.2007.01.007, ISSN 0144-8617, pp. 455-461, XP022068666 [A] 1-15 * paragraph [02.2] * DOI: http://dx.doi.org/10.1016/j.carbpol.2007.01.007.

Yuzuru Akamatsujohn Law, "Enzymatic synthesis of 10-methylene stearic acid and tuberculostearic acid", Biochemical and Biophysical Research Communications, (Oct. 10, 1968), vol. 33, No. 1, doi:10.1016/0006-291X(68)90274-X, pp. 172-176, XP024776216 DOI: http://dx.doi.org/10.1016/0006-291X(68)90274-X.

* cited by examiner

*Primary Examiner* — James E Mcdonough
(74) *Attorney, Agent, or Firm* — DUANE MORRIS LLP; Gregory M. Lefkowitz; Brandon A. Chan

(57) ABSTRACT

The present invention relates to monomers, oligomers and polymers of sugars functionalized with straight or branched fatty acid and derivatives, their compositions and their uses.

20 Claims, No Drawings

MONOMERS, OLIGOMERS AND POLYMERS OF SUGARS FUNCTIONALIZED WITH STRAIGHT OR BRANCHED FATTY ACIDS AND DERIVATIVES, THEIR COMPOSITIONS AND USES

CROSS-REFERENCE TO RELATED APPLICATIONS

This application is a § 371 national stage entry of International Application No. PCT/EP2021/059967, filed Apr. 16, 2021, which claims priority to European Patent Application No. 20170031.7, filed Apr. 17, 2020, the entire contents of which are incorporated herein by reference.

FIELD OF THE INVENTION

The present invention relates to monomers, oligomers and polymers of sugars functionalized with straight or branched fatty acids and derivatives, compositions comprising them and uses thereof.

BACKGROUND OF THE INVENTION

Tuberculostearic acid (10-methylstearic acid) and corresponding 10-methylene biological precursor are known, see, e.g. Yuzuru Akamatsu and John Law, "Enzymatic synthesis of 10-methylene stearic acid and tuberculostearic acid", Biochemical and Biophysiscal Research Communications, Vol. 33, Issue 1, 10 Oct. 1968, pages 172-176.

Even if authors state that tuberculostearic acid is a main component of the phospholipids from *Mycobacterium* species, its low production yield related to total lipid content prevented further industrial use. Recently, Novogy, Inc. was able to insert and to express gene sequences responsible for methylation of fatty acids into *Yarrowia lipolytica* (Shaw et al., "Heterologous production of 10-methyl stearic acid", WO2018/057607).

Fatty acids functionalized as esters onto saccharides, oligosaccharides and polysaccharides are known for various usages, such as emulsifier/surfactant, immunomodulation agent, anti-infective, thickening agent in food products, component of drilling fluid composition, component of formulation for pharmaceutical or veterinary products.

These known fatty acids functionalized as esters onto saccharides, oligosaccharides and polysaccharides generally share common structural features such as linear optionally unsaturated fatty acid chain. Physical properties thereof are usually modified by changing the sugar and/or the sugar patterns as well as the fatty acid chain length and unsaturation number and position, e.g. changing from oleic to α-linolenic, wherein number of unsaturation is modified from, respectively (cis-$\Delta^9$) to (cis, cis, cis, -$\Delta^9$, -$\Delta^{12}$, $\Delta^{15}$), or changing from elaidic to vaccenic acid, wherein the unsaturation moves from, respectively, position trans-$\Delta^9$ to trans-$\Delta^{11}$.

Similarly, isostearic acid, which is a mixture of randomly branched C18 saturated fatty acids usually obtained by isomerization of stearic acid over an acidic zeolite, was recently functionalized onto simple or complex sugars, such as dextrin, as in EP2537865.

Albeit a variety of fatty esters of saccharides were already prepared, there is still a need to provide differentiated products having modified pharmacological, physical and chemical properties.

However, these modifications are sometimes not sufficient when physical properties such as transparency needs to be improved.

SUMMARY OF THE INVENTION

Unexpectedly, it has been found that a polyol fatty ester, comprising (i) a fatty moiety selected from a branched fatty moiety, which is a straight C14, C16, C18 or C20 lipid carboxyl group carrying a 10-methyl or 10-methylene branched substituent or a straight fatty moiety, which is a straight C14, C16, C18 or C20 lipid carboxyl group carrying a unique unsaturation in a position ranging from 7 to 10, (ii) a polyol moiety having at least one hydroxyl group, which is a C5-C7 carbohydrate, optionally in the form of a dimer, oligomer or polymer, wherein each polyol moiety in the said dimer, oligomer or polymer is identical or different, wherein the polyol fatty ester contains at least one branched fatty moiety according to (i), which is linked by ester bonding to the at least one hydroxyl group of the polyol moiety according to (ii) was suitable to provide transparent compositions when mixed with different sorts of oils.

Those polyol fatty esters are suitable for a wide range of applications, in particular for the preparation of (a) wettability modifying composition, (b) oil-in-water or water-in-oil emulsion, (c) pharmaceutical or veterinary form, (d) antibacterial, insecticide or antifungal, (e) additive for polymer processing, (f) food additive, (g) non-metabolizable substitute of fat for weight control in mammalian species, (h) additive for paper processing, (i) additive for biotechnological processing and solubilization of proteins and immune active molecules such as antigens and antibodies, (j) adhesive composition, (k) biodegradable polymer, (l) gelation of oil and (m) cosmetic composition. Preferred application is gelation of oil.

DETAILED DESCRIPTION OF THE INVENTION

According to a first aspect, the invention provides a polyol fatty ester, comprising:
(i) a fatty moiety selected from:
   a branched fatty moiety, which is a straight C14, C16, C18 or C20 lipid carboxyl group carrying a 10-methyl or 10-methylene branched substituent, or
   a straight fatty moiety, which is a straight C14, C16, C18 or C20 lipid carboxyl group carrying a unique unsaturation in a position ranging from 7 to 10, said unique unsaturation being preferably in a Z configuration,
(ii) a polyol moiety having at least one hydroxyl group, which is a C5-C7 carbohydrate, optionally in the form of a dimer, oligomer or polymer, wherein each polyol moiety in the said dimer, oligomer or polymer is identical or different, wherein the polyol fatty ester contains at least one fatty moiety according to (i), which is linked by ester bonding to the at least one hydroxyl group of the polyol moiety according to (ii).

According to a preferred embodiment, the polyol moiety having at least one hydroxyl group is a polymer composition of a C6 carbohydrate in the form of a dextrin having optionally branched polymer chain comprising more than 50 wt % of from 12 to 35 C6 carbohydrate monomers, wherein each polyol moiety in the said polymer is identical or different.

It has been found that aforesaid polyol fatty ester was suitable to provide transparent compositions when mixed with different sorts of oils.

Moreover, those polyol fatty esters behave similarly as state of the art polyol fatty esters with regards to gel formation ability when mixed with different hydrocarbons, natural or synthetic oils and fats. In addition, polyol fatty esters according to the invention, when in the form of a branched fatty moiety esterified onto C5-C7 carbohydrate monomer or dimer, which monomer or dimer being fully esterified, have low pour point and low viscosity, both of which are particularly desirable in high performance lubricant compositions.

The straight unsaturated fatty moiety according to the invention comprises one unsaturation in a position ranging from 7 to 10. Within the meaning of the present invention, an unsaturation in a position # means that the #$^{th}$ carbon atom of the lipid carboxyl group is an unsaturated carbon.

Preferably, the unique unsaturation is in a Z configuration. It has been found that the transparency properties of the resulting polyol fatty ester are improved when the straight fatty moiety has a Z configuration unique unsaturation.

Preferably, if the straight fatty moiety is a C14 carboxyl group, the unsaturation is in position 7; if the straight fatty moiety is a C16 carboxyl group, the unsaturation is in position 8; if the straight fatty moiety is a C18 carboxyl group, the unsaturation is in position 9; and if the straight fatty moiety is a C20 carboxyl group, the unsaturation is in position 10.

An example of a straight fatty moiety of C18 carboxyl group type is oleyl.

The branched fatty moiety according to the invention is preferably chosen among 10-methylstearyl, 10-methylenestearyl, 10-methylpalmityl, 10-methylenepalmityl, 10-methylarachidyl, 10-methylenearachidyl, 10-methylmyristyl or 10-methylenemyristyl, and their combination, preferably 10-methylstearyl, 10-methylpalmityl, 10-methylarachidyl or 10-methylmyristyl, and their combinations, more preferably 10-methylstearyl or 10-methylpalmityl, and their combinations.

Preferably, the branched fatty moiety, when selected among 10-methylstearyl, 10-methylpalmityl, 10-methylarachidyl and 10-methylmyristyl, is chosen among (R) and (S) enantiomers, preferably the (R) enantiomer.

The branched fatty moiety, prior to reaction and formation of ester bonding with the C5-C7 carbohydrate, is present in the form of (a) a fatty acid, (b) a fatty acid chloride, (c) a fatty ester, which fatty ester being preferably esterified with methanol or ethanol, more preferably methanol. Fatty acid chlorides (b) are particularly preferred, and purification thereof by distillation under high vacuum (0.01-0.1 Pa) prior to reaction with the C5-C7 carbohydrate is preferred, when fatty acid chloride preparation has resulted in colored raw material. In this case, the distilled product is colorless, unless the acid chloride contains a chromophore.

The polyol moiety is advantageously a C5 or C6 carbohydrate in the form of a monomer, a dimer, an oligomer comprising from 3 to 10 carbohydrate monomer units, or a polymer comprising from 11 to 10000 carbohydrate monomer units, wherein the oligomer or polymer is optionally branched or cyclized.

The C5 or C6 carbohydrate is preferably chosen among (i) glucose, fructose, galactose, mannose, arabinose, xylose, rhamnose and their combinations in dimers such as preferably saccharose, maltose, trehalose and lactose, (ii) oligomers thereof such as α-, β- and γ-cyclodextrin, (iii) polymers thereof in the form of polysaccharides such as preferably cellulose, dextran, dextrin, amylose, amylopectin, mannan, pullulan, arabinoxylan, callose, laminarin, chrysolaminarin, galactomannan, guar gum and (iv) modified polymers thereof in the form of polysaccharides chosen among chitin, chitosan, xanthan gum, gellan gum and fucoidan.

In this respect, the aforesaid C5 or C6 carbohydrate is advantageously (iii) a polymer composition thereof in the form of a dextrin having optionally branched polymer chain comprising more than 50 wt % of from 12 to 35 C6 carbohydrate monomers, preferably from 15 to 30 C6 carbohydrate monomers, more preferably from 17 to 23 C6 carbohydrate monomers.

In case the C5 or C6 carbohydrate is a dextrin, the degree of substitution of the dextrin by the branched fatty moiety, per glucose unit, is higher than 2.70, preferably higher than 3.00, more preferably higher than 3.03, even more preferably higher than 3.05, most preferably from 3.05 to 3.10.

When 10-methylstearyl is chosen as the branched fatty moiety; the polyol moiety is then preferably a dextrin polymer having in average 20 glucose units, and the degree of substitution of the dextrin by the branched fatty moiety is 3.10.

When oleyl is chosen as the straight fatty moiety; the polyol moiety is then preferably a dextrin polymer having in average 20 glucose units, and the degree of substitution of the dextrin by the branched fatty moiety is 3.10.

Dextrin having an average 17-23 carbohydrate monomers (glucose is the monomer, here), which are fully esterified by 10-methylstearyl moieties, so that no free hydroxyl group is left unesterified on the dextrin, are particularly preferred for the preparation of gels of hydrocarbons, oils and fats. As a result, the degree of substitution of the dextrin is above 3.0, preferably above 3.05.

According to a second aspect of the invention, the polyol fatty ester according to any embodiment of its first aspect may further comprise at least one:

(i) linear or branched, saturated or unsaturated, C2-C24 lipid carboxyl, or (ii) linear or branched, saturated or unsaturated, C2-C24 lipid carboxyl, wherein at least one carbon atom is substituted with a C1-C6 alkoxy, C1-C6 alkoyloxy, C1-C6 alkylamino or C1-C6 dialkylamino, which is esterified to at least one further hydroxyl group of the C5-C7 carbohydrate according to (ii).

The polyol fatty ester according to the second aspect of the invention may have the following specific features, wherein the C2-C24 lipid carboxyl is chosen among acetyl, propionyl, acryloyl, and methacryloyl, and the C3-C24 lipid carboxyl is chosen among 2-acetyloxypropionyl, 2-methoxypropionyl, 2-ethoxypropionyl, 2-acetyloxyacetyl, 2-methoxyacetyl and 2-ethoxyacetyl.

Whatever the polyol fatty ester according to the invention, it is desirable that all the hydroxyl groups present on the polyol moiety be esterified, especially when strong lipophilicity is expected as is the case when preparing polyol fatty ester gels with oils.

Polyol fatty esters according to the invention having a degree of substitution of the polyol equal to or greater than 1.0 ester per polyol, which polyol being constituted by 1, 2 or 3 C5-C7 carbohydrate units, are suitable for use as (i) anti-foaming if the HLB (hydrophilic Lipophilic Balance) is from 1.5 to 3, (ii) water in oil emulsifier if the HLB is from 3 to 6, (iii) foaming if HLB is from 7 to 9, (iv) oil in water emulsifier if HLB is from 9 to 13, (v) non-ionic surfactant if the HLB is from 13 to 15, and (vi) solvent if the HLB is from 15 to 20. HLB can be measured or calculated according to conventional methods.

According to a third aspect, the invention provides for a first composition comprising at least 0.1 wt % and at most 99.9 wt % of a polyol fatty ester, according to any embodiment of the first or second aspect of the invention, and further comprising (a) a linear or branched C8-C20 paraffin or olefin, and/or (b) a mono-, di- or tri-glyceride having a C4-C24 optionally unsaturated optionally branched fatty ester, and/or (c) a phospholipid comprising one or two C8-C24 optionally unsaturated fatty ester bound to glycerol 1-phosphate, and/or (d) water.

The first composition preferably comprises from 96 wt % to 40 wt % of polyol fatty ester, and from 4 wt % to 60 wt %, preferably from 4 wt % to 40 wt %, more preferably from 4 wt % to 20 wt % of a fluid having an initial boiling point and a final boiling point in the range of from 373°K to 673°K, and comprising, based on the total weight of the fluid, more than 95 wt % of isoparaffins and less than 100 ppm aromatic by weight. If the composition does not contain (d) water, then the polyol fatty ester is preferably fully esterified, i.e. it does not contain any free hydroxyl group.

The difference between the final boiling point and the initial boiling point of the fluid is preferably of at most 80° C., preferably at most 70° C., more preferably at most 60° C.

According to an embodiment, the fluid has an initial boiling point and a final boiling point in the range of from 473° C. to 614° K.

The boiling range of the fluid can be determined according to ASTM D86.

A preferred fluid comprises:
C15 isoparaffins and C16 isoparaffins in a combined amount of 80 to 98% by weight based on the total weight of the fluid; or
C16 isoparaffins, C17 isoparaffins and C 18 isoparaffins in a combined amount of 80 to 98% by weight based on the total weight of the fluid; or
C17 isoparaffins and C18 isoparaffins in a combined amount of 80 to 98% by weight based on the total weight of the fluid.

Examples of a suitable fluid comprises:
from 30 to 70% of C15 isoparaffins and from 30 to 70% C16 isoparaffins, preferably from 40 to 60% of C15 isoparaffins and from 35 to 55% C16 isoparaffins, expressed by weight based on the total weight of the fluid; or
from 5 to 25% of C15 isoparaffins, from 30 to 70% C16 isoparaffins and from 10 to 40% of C17 isoparaffins, preferably from 8 to 15% of C15 isoparaffins, from 40 to 60% C16 isoparaffins and from 15 to 25% of C17 isoparaffins, expressed by weight based on the total weight of the fluid; or
from 5 to 30% of C17 isoparaffins and from 70 to 95% C18 isoparaffins, preferably from 10 to 25% of C17 isoparaffins and from 70 to 90% C18 isoparaffins, expressed by weight based on the total weight of the fluid.

A suitable fluid having a boiling point in the range of from 373° K to 673° K, and comprising more than 95 wt % of isoparaffins and less than 100 ppm aromatic by weight can be prepared according to WO2016/185046. Different examples of said suitable fluid can be seen at p. 18 of WO2017/046177.

It may be desired to obtain a second composition comprising from 10 wt % to 90 wt % of either (a) the polyol fatty ester or (b) the first composition, and from 90 wt % to 10 wt % of a lipophilic material preferably chosen among macadamia oil, argan oil, octyldodecanol, isononyl isononanoate, dicapryl carbonate, caprylic/capric triglyceride, C12-C15 alkyl benzoate, isopropyl palmitate, dibutyl adipate, phytosqualane, cartham oil, C15-C19 paraffin oil. The resulting second composition is an appropriate transparent gel suitable for e.g. cosmetic purposes.

According to a fourth aspect, the invention is about the use of a polyol fatty ester or a composition thereof, for the preparation of (a) wettability modifying composition, (b) oil-in-water or water-in-oil emulsion, (c) pharmaceutical or veterinary form, (d) antibacterial, insecticide, nematocide or antifungal, (e) additive for polymer processing, (f) food additive, (g) non-metabolizable substitute of fat for weight control in mammalian species, (h) additive for paper processing, (i) additive for biotechnological processing and solubilization of proteins and immune active molecules such as antigens and antibodies, (j) adhesive composition, (k) biodegradable polymer, (l) lubricant, (m) coating, (n) paint, (o) insulating media, (p) anticorrosion composition, (q) gas permeation and diffusion mitigation, (r) gelation of oil and (s) cosmetic composition, preferably for the gelation of oil. For the purpose of the invention, the following definitions are given:

As used herein, the wording "polyol fatty ester" means a "polyol" under the form of a hydrocarbon having at least one hydroxyl group, which is substituted by a "fatty ester" under the form of a "lipid carboxyl group", to obtain an ester group. Examples of "lipid carboxyl group" include, without limitation; acetyl, propionyl, butyryl, cyclohexylcarbonyl, acryloyl, methacryloyl, benzoyl, 10-methylhexadecanoyl, oleoyl, and 2-ethyl-hexanoyl.

The "lipid carboxyl group" may be present under the form of a lipid carboxylic acid, a lipid carboxylic ester, a lipid carboxylic anhydride or a lipid carboxylic acid chloride, prior to reaction with the "polyol". Reaction conditions are adapted depending on the form of the lipid carboxylic acid, as can be observed from the examples. If one considers the lipid carboxyl group is acetyl, then example of lipid carboxylic acid is acetic acid, example of lipid carboxylic anhydride is acetic anhydride, example of lipid carboxylic acid chloride is acetyl chloride, and examples of lipid carboxylic ester are, without limitation, methyl acetate or ethyl acetate.

A "branched fatty moiety" is to be understood as being a straight chain lipid carboxyl group carrying a branched substituent, provided said branching is not on the terminal carbon opposite to the carbonyl.

A "polyol" is a hydrocarbon comprising oxygen in the form of at least one hydroxyl group. Examples of polyols include propan-1,2-diol, glucose, ethylene glycol, diethylene glycol, cyclohexan-1,2-diol, ascorbic acid, dehydroascorbic acid, glucose, fructose, saccharose, starch, cellulose, dextrin, sorbitol.

A non-limiting example of "polyol fatty ester" that is based on the above definition is peracetylated glucose, wherein the 5 hydroxyl substituents present on a glucose molecule are each substituted with an acetyl moiety to form a pentaester.

As used herein, in the expression "C#", "#" is a positive integer which corresponds to the number of carbon atoms. Example: a C16 hydrocarbon is a hydrocarbon chain or ring having 16 carbon atoms bound together to form an optionally branched chain or an optionally branched ring.

When it is mentioned that a linear aliphatic chain has X carbon atoms, this number X of carbon atoms excludes any carbon branched on the linear aliphatic chain. For example, an aliphatic linear chain of 14 carbon atoms with a branched methyl group has a total of 15 carbon atoms.

The term "ester" here refers to carboxylic acid esters.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

All documents cited in the present specification are hereby incorporated by reference in their entirety. In particular, the teachings of all documents herein specifically referred to are incorporated by reference.

EXAMPLES

Example 1: 10-Methylstearic, 10-Methylenestearic, 10-Methylpalmitic, 10-Methylenepalmitic, 10-Methylmyristic and 10-Methylenemyristic Acids 10-methylstearic, 10-methylenestearic, 10-methylpalmitic, 10-methylenepalmitic, 10-methylmyristic and 10-methylenemyristic acids are obtained from hydrolysis, preferably under acidic conditions, in the presence of an excess of water, of lipids extracted from genetically engineered *Yarrowia* species disclosed in WO2018/057607 to produce free fatty acids, glycerol, and minor constituents such as phosphates and amino acids. Lipids that are extracted from *Yarrowia* typically contain a large amount of C14-C24 mono-di- or tri-fatty esters of glycerol and small amounts of phospholipids as well as free fatty acids. Minor amounts of C12-C13 and C25-C30 fatty acid and/or esters may be present. Hydrolysis conditions are involving conventional methods known to those skilled in the art. Resulting free fatty acids are then separated by solvent extraction. A suitable solvent enables acceptable lipid extraction while avoiding undesirable polar species to be solvated and/or avoids reacting with the fatty acid to be solvated. In this respect, most of polar solvents such as C1-C3 alcohols, DMF (dimethylformamide), acetic acid, DMSO (dimethylsulfoxide) or THF (tetrahydrofuran) are not suitable solvents, while methylene chloride or ethyl acetate are suitable solvents. Solvent is removed from solvated fatty acids by distillation under reduced pressure. The resulting solvent-free fatty acids are then separated by distillation under reduced pressure under a stream of inert gas which is preferably neither water nor hydrogen. An acceptable inert gas is nitrogen or a rare gas such as argon. Various amounts of 10-methylstearic, 10-methylenestearic, 10-methylpalmitic, 10-methylenepalmitic, 10-methylmyristic and 10-methylenemyristic acids are then separately recovered, depending on the origin of the lipid stream which underwent hydrolysis.

Example 2: Esterification of 10-Methylene Stearic Acid with Methanol 10-methylene stearic acid may be esterified with methanol to provide 10-methylene stearic acid methyl ester. Typical reaction conditions involve refluxing 10-methylene stearic acid in a large excess of methanol such as 10 to 50 mole of methanol per mole of 10-methylene stearic acid, preferably in the presence of traces of an acid such as sulfuric or p-toluene sulfonic acid, until most of the starting material has been esterified. Esterification can be monitored using conventional techniques such as thin layer chromatography or gas chromatography. Once the reaction is completed, the mixture is cooled down, remaining methanol solvent is evaporated under reduced pressure. The resulting oily residue is dissolved in ethyl acetate to afford an ethyl acetate fraction, washed with water until washing water reaches at least pH 4, preferably pH 5, more preferably pH 6, most preferably pH 7. Washed ethyl acetate fraction is dried over anhydrous sodium sulfate and solvent is evaporated under reduced pressure to afford dried 10-methylene stearic acid methyl ester. 10-methylene stearic acid methyl ester may be further purified by distillation under reduced pressure, optionally under a stream of inert gas or using a thin film evaporator.

Esters of 10-methylenestearic acid using different C2-C4 alcohols such as ethanol, propanol, isopropanol, butanol, butan-2-ol and 2-methyl-propan-1-ol can undergo the same reaction without significant modification of preparation method.

Esters of 10-methylene palmitic acid and of 10-methylene myristic acid using the same C2-C4 alcohols as above can be prepared using the same method.

Alternatively, mixtures of free fatty acid (FFA) issued from hydrolysis of crude oil originated from Yarrovia may be purified and separated by esterification followed by distillation. It has been found that this method allowed higher recovery yield in pure fatty ester along with lower degradation than direct distillation of FFA followed by esterification.

Example 3: 10-Methylenepalmityl Chloride 268 g of 10-methylenehexadecanoic acid (10-methylenepalmitic acid) may be dissolved in 1000 mL of methylene chloride and 200 mL of dimethylformamide (DMF) in a flask equipped with nitrogen flushing and stirring means. The resulting mixture may be cooled down to 273 °K and 76 mL of sulfonyl chloride in solution within 1000 mL of methylene chloride can be added dropwise under stirring at 273 °K. The mixture is then stirred at room temperature during at least 17 h (hours), until substantially all the 10-methylenehexadecanoic acid has reacted. Reaction progression can be monitored using thin layer chromatography with silica gel plates as stationary phase and 20/80 methanol/methylene chloride mixture as mobile phase. Once reaction is over, solvents and residual sulfonyl chloride are then evaporated under reduced pressure to afford 10-methylenehexadecanoyl chloride as brown oil.

Example 4: Microwave Assisted Esterification of 10-Methylenepalmityl Chloride with Saccharose (Sucrose, Sugar)

10-methylenepalmityl chloride may react with saccharose to afford mono-, di-, tri, tetra- or higher esters of saccharose. Reaction may occur under thermal or microwave heating. Microwave heating is preferred since reaction conditions may be optimized to lower the risk of sugar degradation and occurrence of colored products when overheating.

The reaction under microwave irradiation may be performed using preferably a monomodal microwave reactor in open flasks equipped with temperature control sensor and magnetic stirring. The microwave reactor is preferably equipped with temperature regulation and pressure control to avoid runaway and explosion hazard.

5 g of saccharose may be dissolved in 100 mL of DMF and 64 g of 10-methylenepalmityl chloride is added.

10-methylenepalmityl chloride is preferably distilled under vacuum (0.1-1 Pa), preferably using thin film evaporation technique, before use. The reaction mixture is placed in the microwave cavity, and subjected to microwave irradiation. Irradiation power and reaction temperature are set to limit product degradation, including isomerization. Power output is adjusted from 50 W to 900 W, preferably 100 to 400 W, more preferably 200 to 300 W. Temperature is kept constant at ca. 350-400 °K for 1 to 20 minutes, preferably from 1 to 10 minutes, more preferably from 4 to 6 minutes. The product is cooled down, solvent is removed under reduced pressure and residue is purified by flash chromatography over silica gel, using cyclohexane/ethyl acetate gradient mixture as eluent, then cyclohexane/methanol gradient mixture, affording various 10-methylenepalmityl substituted saccharose products after solvent removal.

Example 5: Esters of Stearic, Palmitic and Myristic Acid Derivatives

Esters of here described stearic, palmitic and myristic acid derivatives may be prepared using conventional methods by contacting a stearic, palmitic or myristic acid derivative or their mixture with an excess of an alcohol to be esterified, optionally in the presence of a strong acid such as sulfuric acid or p-toluene sulfonic acid. Preferably, produced water is removed from the reaction media to limit reverse reaction of hydrolysis. Preferred alcohols include methanol, ethanol, propanol and isopropanol. Preferred esters include methyl, ethyl, propyl and isopropyl esters.

For example, 10-methyl-hexadecanoic acid ethyl ester may be prepared by refluxing 100 g of 10-methyl-hexadecanoic acid in 500 mL of ethanol, optionally in the presence of 0.5 mL of 95 wt % sulfuric acid, with continuous removal of water-ethanol azeotrope vapors. Reaction follow-up and completion can be monitored using conventional thin layer or gas phase chromatography methods. Reaction typically takes place during from 1 to 10 h. The reaction mixture is further cooled down to room temperature (circa. 273-300 °K) and ethanol is evaporated under reduced pressure. The oily residue is dissolved in a solvent, e.g. 500 mL of ethyl acetate, washed with three times 500 mL of water to remove traces of acid when present. The remaining 10-methyl-hexadecanoic acid ethyl ester solution is dried over anhydrous sodium sulfate and solvent is evaporated under reduced pressure to afford 10-methyl-hexadecanoic acid ethyl ester which can be used for further steps.

10-methyl-hexadecanoic acid methyl ester may be prepared by refluxing 10 g of 10-methyl-hexadecanoic acid in 200 mL of methanol in the presence of 0.5 mL of 95 wt % sulfuric acid. Once completed, the reaction mixture is cooled down to room temperature, remaining methanol is partially removed under reduced pressure so that about two thirds of methanol are evaporated, then the residue is extracted with 5 times 200 mL of cyclohexane. The cyclohexane phases are collected, washed with 2 times 50 mL of cold water (circa. 273-300 °K), dried over anhydrous sodium carbonate, then solvents are evaporated under reduced pressure to afford 10-methyl-hexadecanoic acid methyl ester.

When the starting fatty acid material contains unsaturations such as alkene or alkyne functional groups, as this is the case with 10-methylene-hexadecanoic acid, reaction is preferably conducted in the absence of oxygen, preferably in the presence of a stream of inert gas such as nitrogen or argon.

Esters of here-described stearic, palmitic and myristic acid derivatives may be hydrolyzed to the corresponding stearic, palmitic and myristic acid derivative by contacting them with an excess of water in the presence of a strong acid. A suitable strong acid may be sulfuric or p-toluene sulfonic acid. Reaction is preferably conducted under stirring and reflux heating, optionally under a stream of inert gas such as nitrogen or argon if product stability could be impaired by heating in the presence of oxygen gas from air. Produced alcohol is preferably removed from the reaction media to limit reverse reaction of esterification.

Example 6: Tuberculostearic acid Potassium Salt 10 g of tuberculostearic acid (10-methyl-hexadecanoic acid) is dissolved in 100 mL of dimethylformamide (DMF), then a solution of 2 g of KOH in solution within 50 mL of DMF is added dropwise under stirring while maintaining temperature under 300 °K, until acidity in the reaction medium is neutralized. Acidity may be controlled with e.g. pH paper from sample. As a result, some KOH solution in DMF is not added to the solution of 10-methyl-hexadecanoic acid.

The solvent is then removed under reduced pressure to afford pure 10-methyl-hexadecanoic acid potassium salt.

Example 7: Tuberculostearyl Chloride

In general, acyl chloride of branched fatty carboxylic acid such as tuberculostearic acid (i.e. 10-methyl palmitic acid or 10-methyloctadecanoic acid) can be prepared by reacting said branched carboxylic acid with oxalyl chloride or sulfonyl chloride optionally in the presence of a solvent.

298 g of 10-methyloctadecanoic acid is dissolved in 1000 mL of anhydrous methylene chloride and 200 mL of anhydrous dimethylformamide in a flask equipped with nitrogen flushing and stirring means. The resulting mixture is then cooled down to 273 °K and 90 mL of oxalyl chloride in solution within 1000 mL of anhydrous methylene chloride is added dropwise under stirring at 273 °K. The mixture is then stirred at room temperature during at least 17 h, until substantially all the 10-methyloctadecanoic acid has reacted. Reaction progression can be monitored using thin layer chromatography with silica gel plates as stationary phase and 20/80 methanol/methylene chloride mixture as mobile phase. Once reaction is over, solvents and residual oxalyl chloride are then evaporated under reduced pressure to afford 10-methyloctadecanoyl chloride as brown oil.

If colorless tuberculostearyl chloride is desired, vacuum distillation (using thin film evaporation or molecular distillation, at pressure from about 0.1 to 1 Pa and temperature from about 350 to 400 °K) may afford colorless liquid product.

Example 8: Transesterification of Tuberculostearic Acid Methyl Ester with Glucose In a reaction vessel equipped with stirrer, condenser, vacuum means and heating can be heated at 408 °K for 3 hours at 10 kPa a mixture of 60 g of glucose, 12 g of 10-methylstearic acid potassium salt (potassium 10-methylstearate) and 300 g of 10-methylstearic acid methyl ester (tuberculostearic acid methyl ester), then a flow of n-hexane gas can be introduced within the reaction mixture at a rate of approximatively 260 L/h during at least one hour, preferably at least two hours to improve transesterification yield. The reaction mixture can be cooled down and used as such, or residual basicity may be mitigated with the addition of a mild acid such as $NaHSO_4$ or $KH_2PO_4$ and washed with brine and/or water to remove salts.

The average esterification ratio of 10-methylstearyl moiety to glucose is expected at about 3 to 1, which means that each glucose unit is substituted with three 10-methylstaryl moieties in average.

Example 9: Transesterification of Tuberculostearic Acid Methyl Ester with Trehalose to Provide Trehalose Fatty Esters A mixture of 104 g of 10-methylstearic acid methyl ester, 5 g of potassium 10-methylstearate, 0.4 g of $K_2CO_3$ and 16 g of trehalose dihydrate (α-D-glucopyranosyl-α-D-glucopyranoside, dehydrate) can be heated in a flask equipped with a condenser and trap cooled with acetone/dry ice under a stream of nitrogen until temperature reaches 170° C., and then heating is continued at a pressure of from 10 to 50 kPa under a stream of nitrogen which is introduced within the reaction mixture (e.g. bubbling). Heating is continued until there is no more vapor condensation inside the trap, which may occur after 5 to 48 hours. Reaction is then cooled down, atmospheric pressure is then restored using nitrogen gas flushing within the flask. The resulting mixture is diluted with 1 L of xylene and filtered. The residue is slowly and repeatedly washed with warm water (ca. 290-320 °K) until the aqueous solution after filtration is substantially neutral, i.e. close to pH 7. Xylene phase is separated from water phase and is dried over sodium sulfate. dried xylene phase is mixed with 10 g of charcoal and the mixture is heated under reflux for 30 minutes under a stream of nitrogen. The mixture is then cooled down and filtered to obtain a filtrate. Solvent is separated from the filtrate by evaporation under reduced pressure to afford the desired trehalose fatty ester as a mixture of products, which composition may be determined by conventional HPLC (High Performance Liquid Chromatography) methods. It is postulated the relative amount of products constituting the resulting trehalose fatty ester mixture may be measured by HPLC peak area integration, and may comprise between 20-60% of trehalose octaester, 10-50% of trehalose heptaester, 5-30% of trehalose hexaester and 0-20% of a group of lower esters of trehalose, which is constituted by mono to pentaesters. Every fatty moiety in each of the obtained trehalose esters is constituted by a 10-methyl stearyl moiety.

Trehalose fatty ester mixture may be purified by liquid chromatography using appropriate solvent mixture as eluent and silica gel or alumina as stationary phase or using preparative HPLC. For instance, an appropriate ternary mixture of cyclohexane, ethyl acetate and methanol may be prepared for that purpose. Exact proportion of each solvent can be determined using routine methods such as separation trials on TLC (Thin Layer Chromatography). Typically, composition of the ternary mixture, which may be varied so as to result in solvent polarity gradient, may allow separation and isolation of a broad range of products from the mixture.

Example 10: Dextrin Fatty Esters

Dextrin was esterified with tuberculostearyl chloride (10-methylstearyl chloride) to provide a dextrin ester. Dextrin is meant here to have a DE (Dextrose Equivalent) index from 4 to 7. Dextrin chain length may be measured using conventional technique of molecular weight assessment of polymers via gel permeation chromatography.

173 g of 10-methylstearyl chloride (optionally dissolved in 50 mL of anhydrous DMF) is added dropwise to 16 g of dextrin having an average 20 glucose units per polymer chain in 50 mL of anhydrous DMF and 50 mL of anhydrous pyridine at 343 °K. The resulting brown mixture is heated at 363 °K under argon for 15 h. Once cooled down to room temperature, 300 mL of methanol are added, the mixture is stored at 245-255 °K for 24 h to allow formation and growth of a light brown precipitate, which is collected, washed successively with methanol and acetone and dried under vacuum to afford 168.6 g of dextrin tuberculostearyl ester as powder having in average 3.1 10-methylstearyl ester chains per glucose monomer. In the present case, all the free hydroxyl groups on the dextrin polymer were esterified during the reaction.

Dextrin having a DE from 4 to 7 may also be esterified with palmityl chloride to provide a dextrin palmityl ester having in average 3.1 palmityl ester chains per glucose monomer using the same method as above. Alternatively, another dextrin palmityl ester may be purchased from Chiba Flour Milling, sold under the trade names Rheopearl KL2 and Rheopearl TL2.

Dextrin having a DE of 12 (corresponding to an average of 10 C6 carbohydrate monomer) has also been esterified with palmityl chloride to provide a dextrin palmityl ester having in average 3.1 palmityl ester chains per glucose monomer using the same method as above.

Dextrin having a DE of 3 (corresponding to an average of 40 C6 carbohydrate monomer) has also been esterified with palmityl chloride to provide a dextrin palmityl ester having in average 3.1 palmityl ester chains per glucose monomer using the same method as above.

Dextrin having a DE from 4 to 7 has also been esterified with oleoyl chloride to provide a dextrin oleic ester, according to the following process:

173 g of oleoyl chloride (optionally dissolved in 50 mL of anhydrous DMF) is added dropwise to 16 g of dextrin having an average 20 glucose units per polymer chain in 50 mL of anhydrous DMF and 50 mL of anhydrous pyridine at 343 °K. The resulting brown mixture is heated at 363 °K under argon for 15 h. Once cooled down to room temperature, 300 mL of methanol are added, the mixture is stored at 245-255 °K for 24 h to allow formation and growth of a light brown precipitate, which is collected, washed successively with methanol and acetone and dried under vacuum to afford 168.6 g of dextrin oleoyl ester as powder having in average 3.1 oleoyl ester chains per glucose monomer. In the present case, all the free hydroxyl groups on the dextrin polymer were esterified during the reaction.

Example 11: Dextrin Fatty Ester Gel Compositions

Dextrin tuberculostearyl ester and dextrin palmityl ester (Rheopearl TL2) powders were each separately dispersed in different oils and their properties assessed. Results are given in table 1, below. The isoparaffinic fluid used in the present example is identical to the fluid of Ex. 3 of page 15 of WO2016/185046.

In table 1, oil dispersion of dextrin tuberculostearyl ester and dextrin palmityl ester having a DE of 4 to 7 (Rheopearl TL2) was performed at 358°K under stirring, then the mixture was cooled down to room temperature once dispersion was achieved.

Dextrin fatty ester prepared by esterification of isostearic acid over dextrin having a DE from 4 to 7 also results in opaque gels when mixed with an oil of table 1.

TABLE 1

| Oil type | Dextrin tuberculostearyl ester (example 10) | | | Dextrin palmityl ester (Rheopearl TL2) | | |
|---|---|---|---|---|---|---|
| | Thickening (gel) | Amount (Wt %) | Transparency at 293° K | Thickening (gel) | Amount (Wt %) | Transparency at 293° K |
| Macadamia | OK | 4% | Yes | OK | 4% | No |
| Octyldodecanol | OK | 13% | Yes | OK | 4% | No |
| Isononyl Isononanoate | OK | 11% | Yes | OK | 4% | No |
| Dicaprylyl carbonate | OK | 8% | Yes | OK | 4% | No |
| Caprylic/Capric Triglyceride | OK | 4% | Yes | OK | 4% | No |
| C12-C15 Alkyl benzoate | OK | 4% | Yes | OK | 4% | No |
| Isopropyl palmitate | OK | 10% | Yes | OK | 4% | No |
| Dibutyl adipate | OK | 4% | Yes | OK | 4% | No |
| Phytosqualane | OK | 4% | Yes | OK | 4% | No |
| Carthame | OK | 15% | Yes | OK | 4% | No |
| isoparaffinic fluid | OK | 15% | Yes | OK | 4% | No |

Transparency was visually assessed. Rheopearl TL2 results in cloudy opaque gels at room temperature when dispersed in any oil type used in example 11. Transparency may also be assessed by light transmittance measurement using conventional spectrophotometers on the full visible light spectrum from about 400 to about 800 nm or alternatively by measurement of reflectance. Column "Amount (wt %) corresponds to the weight amount of dextrin derivative relative to the weight amount of the final composition: If 4 wt % of dextrin tuberculostearyl ester is added to macadamia oil, it means that 4 g of dextrin tuberculostearyl ester is added within 96 g of macadamia oil.

Predispersion of dextrin tuberculostearyl ester or Rheopearl TL2 with 10-40 wt % of the isoparaffinic fluid allowed further dispersion of oils listed in table 1 at lower temperature, ca. 328 °K. Isoparaffinic fluid amounts up to 40 wt % (wt %=weight percent) were used with dextrin tuberculostearyl ester without significant impairment of transparency at 293 °K along with thickening increase. No change in lack of transparency could be noticed when preparing Rheopearl TL2 predispersion with the isoparaffinic fluid followed by dispersion with the oils listed in table 1. This method is thus particularly advantageous in view of gel formation when dispersion of heat sensitive oils and other ingredients is desired. Transparency at room temperature (293 °K) is thus an attractive feature of oil dispersions of dextrin tuberculostearyl ester when compared with oil dispersions of dextrin palmityl ester.

Dextrin oleoyl ester forms a transparent gel at 293 °K when added in a powder form in the isoparaffinic fluid, in an amount of 30% by weight based on the total weight of the isoparaffinic fluid and dextrin oleoyl ester.

Dextrin palmityl esters (with DE of 12 and with a DE of 3) prepared in example 10, does not allow to obtain a transparent gel when these esters are added in the oils listed in table 1 in an amount of 4% wt. An opaque gel is obtained. Additionally, this opaque gel is not stable since after 48 h (storage), an exudation (separation of the dextrin palmityl ester and the oil) is observed.

In conclusion, a polymer composition of a C6 carbohydrate in the form of a dextrin having branched polymer chain comprising more than 50 wt % of from 12 to 35 C6 carbohydrate monomers, wherein each polyol moiety in the said polymer is identical or different, allows providing a polyol fatty ester that is able to form a stable transparent gel.

The invention claimed is:
1. A polyol fatty ester, comprising:
(i) a fatty moiety selected from:
  a branched fatty moiety, which is a straight C14, C16, C18 or C20 lipid carboxyl group carrying a 10-methyl or 10-methylene branched substituent, or
  a straight fatty moiety, which is a straight C14, C16, C18 or C20 lipid carboxyl group carrying a unique unsaturation in a position ranging from 7 to 10,
(ii) a polyol moiety having at least one hydroxyl group, which is a polymer composition of a C6 carbohydrate in the form of a dextrin having optionally branched polymer chain comprising more than 50 wt % of from 12 to 35 C6 carbohydrate monomers, wherein each polyol moiety in the said polymer is identical or different,
wherein the polyol fatty ester contains at least one fatty moiety according to (i), which is linked by ester bonding to the at least one hydroxyl group of the polyol moiety according to (ii),
wherein all the hydroxyl groups present on the polyol moiety are esterified.

2. The polyol fatty ester of claim 1, wherein the fatty moiety (i) is a branched fatty moiety selected from 10-methylstearyl, 10-methylenestearyl, 10-methylpalmityl, 10-methylenepalmityl, 10-methylarachidyl, 10-methylenearachidyl, 10-methylmyristyl or 10-methylenemyristyl, and their combinations.

3. The polyol fatty ester of claim 2, wherein the branched fatty moiety, when selected among 10-methylstearyl, 10-methylpalmityl, 10-methylarachidyl and 10-methylmyristyl, is chosen among (R) and (S) enantiomers.

4. The polyol fatty ester of claim 1, wherein the dextrin has optionally branched polymer chain comprising more than 50 wt % of from 15 to 30 C6 carbohydrate monomers.

5. The polyol fatty ester of claim 1, wherein the degree of substitution of the dextrin by the branched fatty moiety, per glucose unit, is higher than 2.70.

6. The polyol fatty ester of claim 5, wherein the branched fatty moiety is 10-methylstearyl; the polyol moiety is a dextrin polymer having in average 20 glucose units, and the degree of substitution of the dextrin by the branched fatty moiety is 3.10.

7. The polyol fatty ester of claim 1, further comprising at least one:
(i) linear or branched, saturated or unsaturated, C2-C24 lipid carboxyl, or
(ii) linear or branched, saturated or unsaturated, C2-C24 lipid carboxyl, wherein at least one carbon atom is substituted with a C1-C6 alkoxy, C1-C6 alkoyloxy, C1-C6 alkylamino or C1-C6 dialkylamino, which is esterified to at least one further hydroxyl group of the dextrin polymer according to (ii).

8. The polyol fatty ester of claim 7, wherein the C2-C24 lipid carboxyl is chosen among acetyl, propionyl, acryloyl, and methacryloyl, and the C3-C24 lipid carboxyl is chosen among 2-acetyloxypropionyl, 2-methoxypropionyl, 2-ethoxypropionyl, 2-acetyloxyacetyl, 2-methoxyacetyl and 2-ethoxyacetyl.

9. A first composition comprising at least 0.1 wt % and at most 99.9 wt % of a polyol fatty ester, according to claim 1, and further comprising
(a) a linear or branched C8-C20 paraffin or olefin, and/or
(b) a mono-, di- or tri-glyceride having a C4-C24 optionally unsaturated optionally branched fatty ester, and/or
(c) a phospholipid comprising one or two C8-C24 optionally unsaturated fatty ester bound to glycerol 1-phosphate, and/or
(d) water.

10. The first composition according to claim 9, comprising from 96 wt % to 40 wt % of polyol fatty ester, and from 4 wt % to 60 wt % of a fluid having an initial boiling point and a final boiling point in the range of from 373°K to 673°K, the fluid comprising more than 95 wt % of isoparaffins and less than 100 ppm aromatic by weight, based on the total weight of the fluid.

11. The first composition according to claim 10, wherein the fluid has a biodegradability at 28 days of at least 60%, measured according to OECD 306.

12. The first composition according to according to claim 10, wherein the fluid comprises:
C15 isoparaffins and C16 isoparaffins in a combined amount of 80 to 98% by weight based on the total weight of the fluid; or
C16 isoparaffins, C17 isoparaffins and C18 isoparaffins in a combined amount of 80 to 98% by weight based on the total weight of the fluid; or
C17 isoparaffins and C18 isoparaffins in a combined amount of 80 to 98% by weight based on the total weight of the fluid.

13. A second composition comprising from 10 wt % to 90 wt % of the first composition according to claim 9, and a lipophilic material.

14. A method of preparing (a) a wettability modifying composition, (b) an oil-in-water or water-in-oil emulsion, (c) a pharmaceutical or veterinary form, (d) an antibacterial, insecticide, nematocide or antifungal, (e) an additive for polymer processing, (f) a food additive, (g) a non-metabolizable substitute of fat for weight control in mammalian species, (h) an additive for paper processing, (i) an additive for biotechnological processing and solubilization of proteins and immune active molecules, (j) a adhesive composition, (k) a biodegradable polymer, (l) a lubricant, (m) a coating, (n) a paint, (o) an insulating media, (p) an anticorrosion composition, (q) a gas permeation and diffusion mitigation, (r) a gelation of oil, or (s) a cosmetic composition comprising the step of adding the polyol fatty ester or composition thereof according to claim 1.

15. The polyol fatty ester of claim 2, wherein the branched fatty moiety selected from 10-methylstearyl, 10-methylpalmityl, 10-methylarachidyl or 10-methylmyristyl, and their combinations, more preferably 10-methylstearyl or 10-methylpalmityl, and their combinations.

16. The polyol fatty ester of claim 3, comprising the (R) enantiomer.

17. The polyol fatty ester of claim 1, wherein the dextrin has optionally branched polymer chain comprising more than 50 wt % of from 17 to 23 C6 carbohydrate monomers.

18. A method of preparing (a) a wettability modifying composition, (b) an oil-in-water or water-in-oil emulsion, (c) a pharmaceutical or veterinary form, (d) an antibacterial, insecticide, nematocide or antifungal, (e) an additive for polymer processing, (f) a food additive, (g) a non-metabolizable substitute of fat for weight control in mammalian species, (h) an additive for paper processing, (i) an additive for biotechnological processing and solubilization of proteins and immune active molecules, (j) a adhesive composition, (k) a biodegradable polymer, (l) a lubricant, (m) a coating, (n) a paint, (o) an insulating media, (p) an anticorrosion composition, (q) a gas permeation and diffusion mitigation, (r) a gelation of oil, or (s) a cosmetic composition comprising the step of adding the first composition of claim 9.

19. A method of preparing (a) a wettability modifying composition, (b) an oil-in-water or water-in-oil emulsion, (c) a pharmaceutical or veterinary form, (d) an antibacterial, insecticide, nematocide or antifungal, (e) an additive for polymer processing, (f) a food additive, (g) a non-metabolizable substitute of fat for weight control in mammalian species, (h) an additive for paper processing, (i) an additive for biotechnological processing and solubilization of proteins and immune active molecules, (j) a adhesive composition, (k) a biodegradable polymer, (l) a lubricant, (m) a coating, (n) a paint, (o) an insulating media, (p) an anticorrosion composition, (q) a gas permeation and diffusion mitigation, (r) a gelation of oil, or(s) a cosmetic composition comprising the step of adding the second composition of claim 13.

20. The second composition of claim 13, wherein the lipophilic material, is selected from macadamia oil, argan oil, octyldodecanol, isononyl isononanoate, dicapryl carbonate, caprylic/capric triglyceride, C12-C15 alkyl benzoate, isopropyl palmitate, dibutyl adipate, phytosqualane, cartham oil, or C15-C19 paraffin oil.

* * * * *